(No Model.)
J. W. ROSS.
DEVICE FOR HANDLING COOKING PANS.
No. 252,143. Patented Jan. 10, 1882.
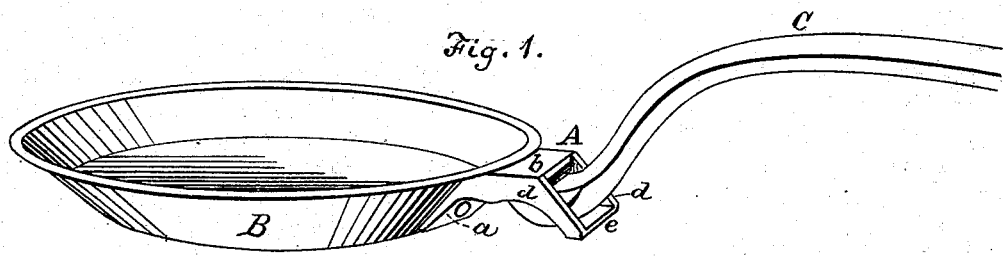
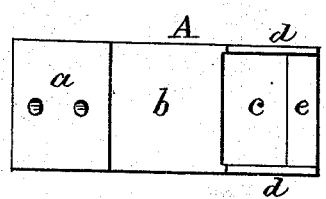
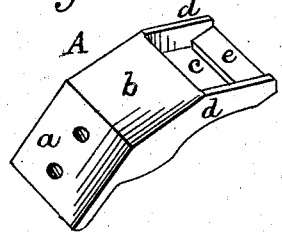
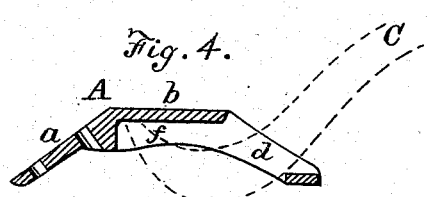
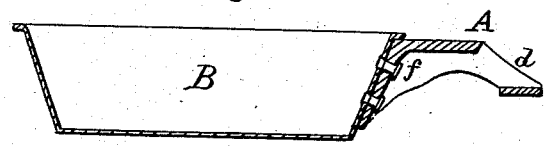
Witnesses:
G. B. Towles.
H. A. Daniels.
Inventor:
John W. Ross
By W. Burris
Attorney.

UNITED STATES PATENT OFFICE.

JOHN W. ROSS, OF SANTA CLARA, CALIFORNIA.

DEVICE FOR HANDLING COOKING-PANS.

SPECIFICATION forming part of Letters Patent No. 252,143, dated January 10, 1882.

Application filed May 25, 1881. (No model.)

*To all whom it may concern:*

Be it known that I, JOHN W. ROSS, of Santa Clara, in the county of Santa Clara and State of California, have invented certain new and useful Improvements in Devices for Handling Cooking-Pans; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a convenient device and method for handling pans used for cooking and baking purposes. Various implements have been devised for this purpose, all of which have been objectionable, for the reason, among others, that such implements, being designed exclusively for that purpose, are often mislaid and not at hand when needed.

My invention consists in providing such pans with a holding device, as hereinafter described and claimed, adapted to receive and hold any ordinary stove-lid lifter so that the pans may be readily handled by such a lifter, which is constantly under the eye of the cook and always at hand when needed.

In the drawings, Figure 1 is a perspective view of a pan provided with the holding device with an ordinary lid-lifter inserted in the holder. Fig. 2 is a top view of the holding device detached. Fig. 3 is a perspective of the holding device detached. Fig. 4 is a sectional view of the holder, showing in dotted lines the lifter inserted in the holder. Fig. 5 is a sectional view, showing a modified form of the holder attached to a large bread-pan.

A represents the holding device, having the inclined part *a* provided with rivet-holes for attaching the holder to a pan, B. This attaching part of the holder may be constructed with any required inclination to the middle part, *b*, and may be given any required form to adapt it to the inclination and shape of the side of the pan to which the holder may be attached.

The outer end of the holder is provided with an opening, *c*, to receive the lifter C, and the sides, *d*, which serve as guides to the lifter, are tied together at their ends by the connecting-piece *e*, forming a bearing for the lifter depressed below the opening *c*. The under part of the holder is recessed at *f* to receive the point of the lifter, as shown in Fig. 4 of the drawings.

This holding device may be molded or stamped from heavy sheet metal, and may be rigidly fastened to any sheet metal pan of any form or size; or the holder may be cast with any cast pan, and may be formed on sheet-metal pans of the metal of which the pans are made. That part of the device which receives the lifter is constructed and arranged on the pan so that the lifter may be inserted at the side, rather than at the top, for readily lifting the pan into and out of a hot oven without burning the hand.

I am aware of the patent to G. W. Mason, No. 127,905, June 11, 1872, which shows a wafer-iron with a handle provided with an opening to receive a stove-lid lifter; but that device would not answer the purpose of my invention, because in that the holder, being in the handle, is not adapted to be attached immediately to the side of a cooking-pan, and the lifter must be inserted at the top or from above, which would not permit the pan to be readily placed in or removed from a hot oven without liability of burning the hands.

What I claim as new, and desire to secure by Letters Patent, is—

1. A holding device, A, adapted to be attached immediately on the side of a cooking or baking pan, and constructed with an opening, *c*, and a bearing, *e*, depressed below the opening, arranged to receive laterally and hold any ordinary stove-lid lifter so that the pan may be readily handled by such lifter, substantially as and for the purposes described.

2. A pan for cooking or baking purposes, provided immediately on the side with the holding device A, having the opening *c* and the bearing *e* depressed below the opening, arranged to receive laterally an ordinary stove-lid lifter, so that the pan may be readily placed in and removed from the oven of a stove, substantially as and for the purposes described.

In testimony that I claim the foregoing as my own invention I affix my signature in presence of two witnesses.

JOHN W. ROSS.

Witnesses:
FRANK M. GREEN,
H. A. DANIELS.